G. F. NEITZEL.
VEHICLE UNLOADING PLATFORM.
APPLICATION FILED JULY 8, 1920.
1,403,055.
Patented Jan. 10, 1922.
3 SHEETS—SHEET 1.
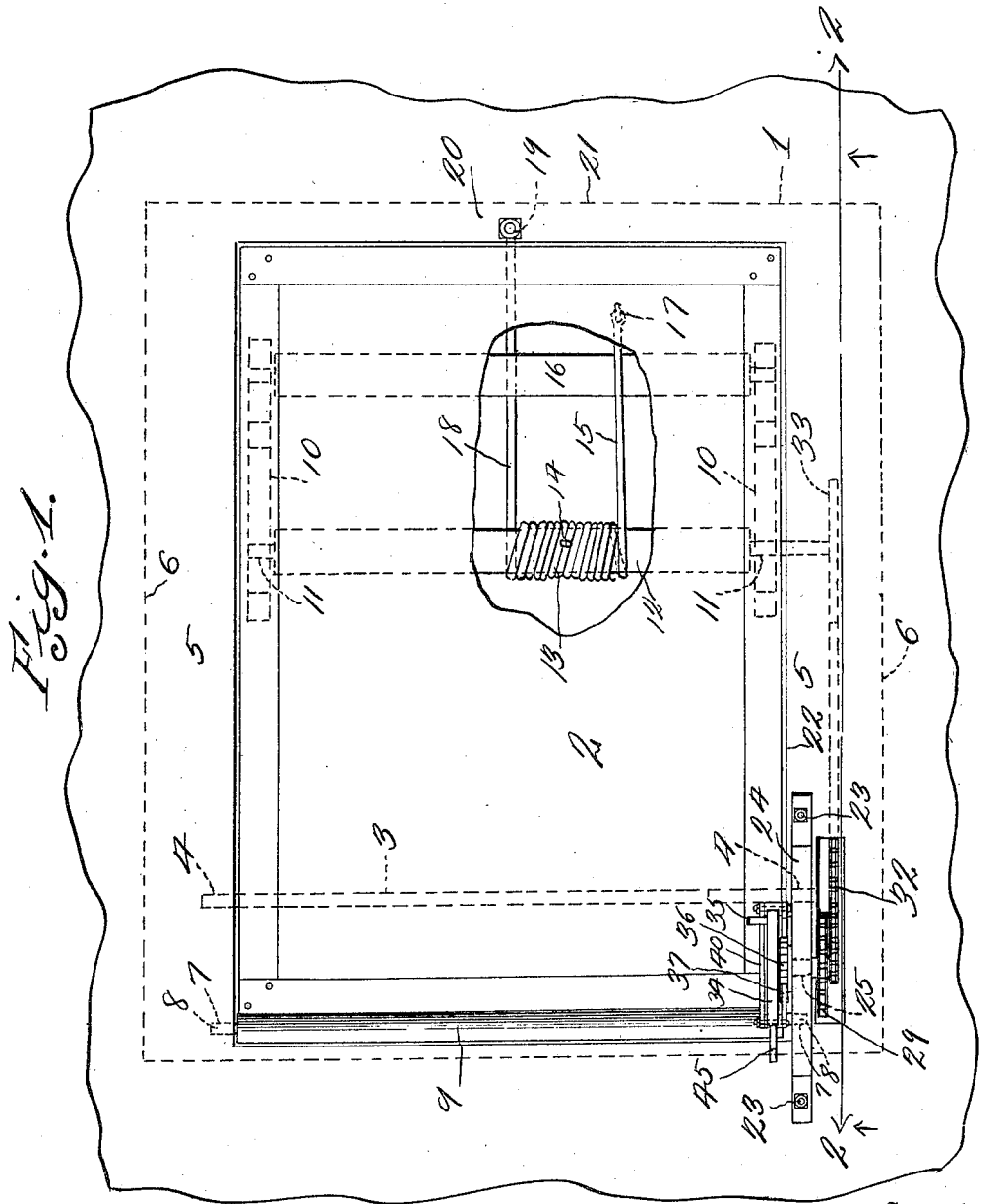
Inventor
George F. Neitzel
By D. Swift
Attorney

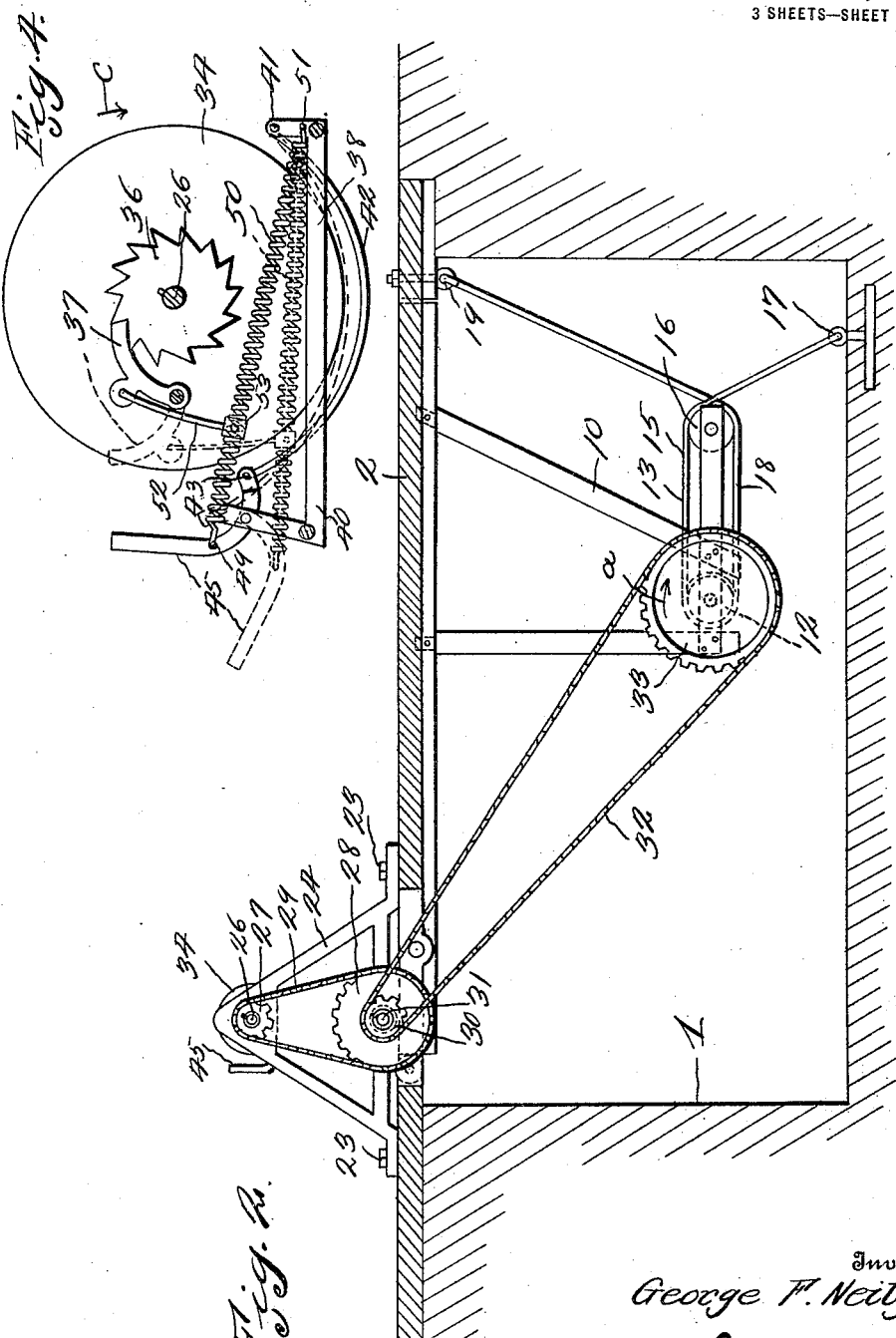

G. F. NEITZEL.
VEHICLE UNLOADING PLATFORM.
APPLICATION FILED JULY 8, 1920.
1,403,055.
Patented Jan. 10, 1922.
3 SHEETS—SHEET 3.
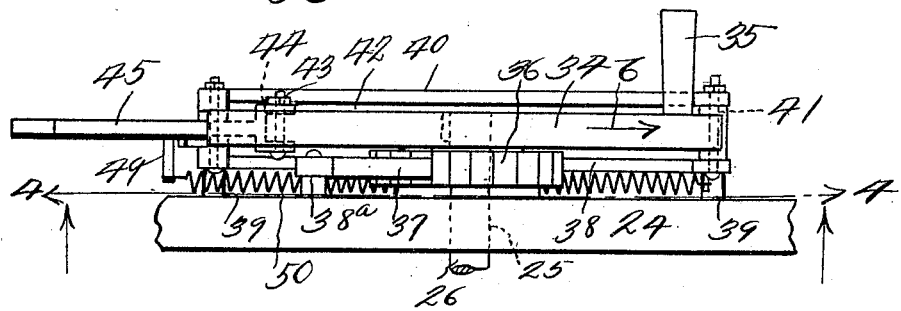
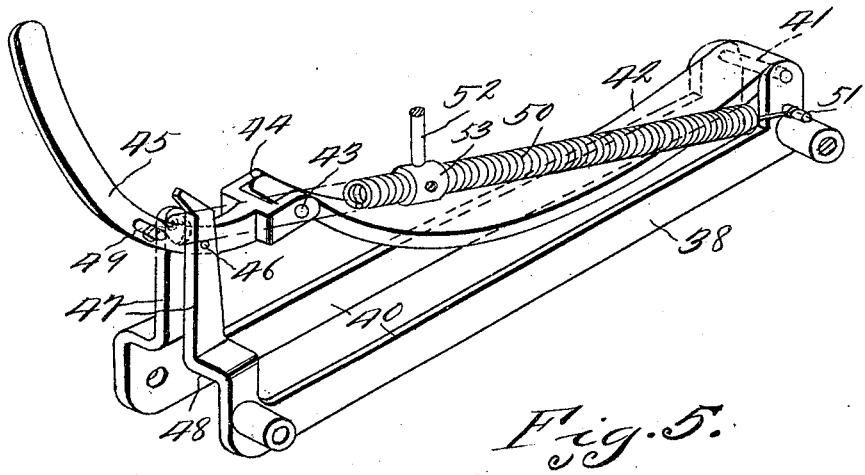
Inventor
George F. Neitzel
By D. Swift
Attorney

UNITED STATES PATENT OFFICE.

GEORGE F. NEITZEL, OF LYONS, NEBRASKA.

VEHICLE-UNLOADING PLATFORM.

1,403,055.

Specification of Letters Patent. Patented Jan. 10, 1922.

Application filed July 8, 1920. Serial No. 394,648.

*To all whom it may concern:*

Be it known that I, GEORGE F. NEITZEL, a citizen of the United States, residing at Lyons, in the county of Burt, State of Nebraska, have invented a new and useful Vehicle-Unloading Platform; and I do hereby declare the following to be a full, clear, and exact description of the invention, such as will enable others skilled in the art to which it appertains to make and use the same.

The invention relates to tiltable platforms on which vehicles may be run and the platform tilted, so that the contents of the vehicle may be dumped.

A further object is to provide a tiltable platform pivoted at one of its ends, which platform is tilted by means of a sprocket wheel and a sprocket chain connection operating a roller, around which roller a cable is wound, said cable having one of its ends extending over an idle pulley and connected at a permanent point of the platform pit, while the other cable end passes under the idle roller and has its end permanently secured at a fixed point so that as the main roller is rotated the free end of the platform will move upwardly so that said platform may be tilted for dumping the contents of the vehicle body.

A further object is to provide a roller transversely disposed against which roller the wheels of the vehicle will rest during a platform tilting operation.

A further object is to provide an operating wheel having a handle member and a ratchet wheel operable with said handle member, with which ratchet wheel a pivoted pawl cooperates to hold the platform in any position to which it may be moved, said pawl being controlled with a lever which controls a frictional brake band which cooperates with the periphery of the operating wheel and is so controlled that when the brake band is in engagement with the operating wheel the pawl will be out of engagement with the ratchet wheel and when the brake band is in engagement with the periphery of the operating wheel, the pawl will be out of engagement with the ratchet, thereby allowing the lowering of the platform under the control of the brake band.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the tiltable platform.

Figure 2 is a longitudinal sectional view taken on line 2—2 of Figure 1.

Figure 3 is an enlarged top elevation of the operating and controlling mechanism.

Figure 4 is an enlarged detail sectional view of the operating and controlling mechanism taken on line 4—4 of Figure 3.

Figure 5 is a perspective view of the brake band bracket showing the brake band and its controlling lever.

Referring to the drawings, the numeral 1 designates a pit, and 2 the tiltable platform on which platform the vehicle is driven before said platform 2 is tilted. Platform 2 is provided with shaft 3 the ends of which are mounted in bearings 4 on the inwardly extending portions 5 extending inwardly from the side walls 6 of the pit 1. Shaft 3 forms a tilting point for the platform as a whole. Rotatably mounted in bearings 7 of the portions 5 are the pintles 8 of the roller 9, against which roller wheels of the vehicle rest during the tilting operation, thereby preventing displacement of the vehicle at the same time by providing a roller, the roller will revolve during the tilting operation and consequently allow the wheels to remain in engagement with the platform.

Extending downwardly from the forward end of the platform 2 are spaced brackets 10, in bearings 11 of which are rotatably mounted pintles of the roller 12, around which roller a cable 13 is wound or coiled, said cable being fastened as at 14 to the roller 12 so as to prevent slipping of the cable on the roller 12, when said roller is rotated. The end 15 of the cable 13 extends forwardly and over an idle roller 16, said cable, then extending downwardly has its end secured to an eye 17 in the pit 1. The other end 18 of the cable 13 extends forwardly and under the idle roller 16, thence extends upwardly and has its end secured to an eye bolt 19 carried by the portion 20, which extends inwardly from the front walls 21 of the pit 1, It will be seen that as the roller 12 revolves that the ends 15 and 18 of the cable will be wound on the roller 12 according to the direction of rotation of the roller 12, thereby raising or lowering the tiltable platform in the bearings 4, so that the vehicle will be dumped.

Secured adjacent one side of the platform opening 22 by means of bolts 23 is an upwardly extending bracket 24, in a bearing 25 of which a shaft 26 rotates. The outer end of the shaft 26 has secured thereto a sprocket wheel 27, and around which sprocket wheel and an enlarged sprocket 28, a sprocket chain 29 extends. Sprocket wheel 28 is provided with an integral sprocket wheel 30 adapted to rotate therewith, said sprocket wheels 28 and 30 being rotatably mounted on a stub shaft 31. A second sprocket chain 32 extends around the sprocket 30 and around the large sprocket 33, carried by one of the pintles of the roller 12, thus it will be seen that when the shaft 26 is rotated that a rotary movement will be imparted to the roller 12 and when the sprocket 30 is moving in the direction of the arrow $a$, that the end 18 of the cable 13 will be shortened so as to cause the platform 2 to move upwardly at its free end, at the same time the end 15 of the cable will be simultaneously unwound from the roller 14 so as to allow the free end of the platform to move upwardly. Secured to the inner end of the shaft 26 is an operating wheel 34, which wheel is provided with a handle 35 adapted to be engaged by the hand of the operator and rotated in the direction of the arrow $b$ for raising the free end of the platform. Keyed or otherwise secured to the shaft 26 is a ratchet wheel 36, which ratchet wheel is engaged by a pawl 37 pivoted as at 38 to the bracket 24, said pawl cooperating with the ratchet wheel 36 so that retrograde movement of the operating wheel 34 will be prevented during a raising operation and also forming means for holding the platform at any angle to which it may be tilted.

It has been found that in devices of this character which are used by inexperienced persons, that it is necessary to provide means for preventing the device from getting out of control of the operator, and to overcome this particular difficulty, a clutch mechanism is provided which is spring actuated and so constructed that when the pawl 37 is out of engagement with the teeth of the ratchet 36, spring means will force the brake mechanism into operation for preventing the rotation of the operating wheel. The brake mechanism comprises a bracket 38, which bracket is secured as at 39 to the bracket 24 and comprises spaced bars 40. One end of the bracket 38 is pivotally connected as at 41 on a lug carried by the bracket 24. A brake band 42 is also pivoted at one of its ends on the lug carried by the bracket, the other end of said brake band 42 being pivotally connected as at 43 in a bifurcation 44 of a lever 45, which lever is pivotally mounted as at 46 between upwardly extending arms 47 carried by the member 40 of the bracket 38. The upwardly extending arms 47 are set inwardly toward each other in relation to the spaced bars 40 so as to form an enlarged portion or space 48. Connected to a pin 49 carried by the lever 45 is one end of a coiled spring 50, the other end of said coiled spring being connected to a pin 51. Pins 49 and 51 are so positioned that the pivotal point 46 will pass through and between the pins 49 and 51 when the lever 45 is moved upwardly or downwardly, therefore it will be seen that when the lever 45 is moved downwardly that after the lever has moved to a certain position, the coiled spring 50 will cause the further downward movement of the lever 45 and will cause the brake band 42 to move into binding engagement with the periphery of the operating wheel 34, thereby holding the operating wheel against rotation. During the downward movement of the lever 45, the dog 37 which is pivoted to the bracket 24, will be moved out of engagement with the ratchet wheel 36 by means of the arm 52 which is carried by a sleeve 53, surrounding the coiled spring 50. The dog will be moved to the dotted position shown in Figure 4, which dotted position is an extreme position so that when it is desired to lower the platform 2, it will only be necessary for the operator to pull upwardly on the lever 45 and reduce the frictional engagement of the brake band 42 sufficiently to allow controlled rotation of the operating wheel 34 in the direction of the arrow $c$. After the platform has been lowered to a horizontal position, lever 45 is moved upwardly to the full line position shown in Figure 4, thereby again placing the ratchet pawl 37 in engagement with the ratchet 36 and the spring by this operation is again positioned so as to prevent the pawl from coming out of engagement with the ratchet 36 during a subsequent tilting operation.

From the above it will be seen that an operating mechanism is provided for a tilting platform, which may be operated by an unskilled person and it will also be seen that a mechanism is provided whereby the platform will be positively actuated and the possibility of the operators losing control of the tilting mechanism is obviated.

The invention having been set forth what is claimed as new and useful is:—

1. The combination with a tiltable platform pivoted adjacent one of its ends, of downwardly extending brackets carried by the platform, rollers rotatably mounted in said brackets, a cable having a series of coils around one of the rollers, one of the ends of the cable extending over the second roller and having its end permanently secured to a fixed point, the other end of the cable extending under the roller and extending upwardly and having its end secured at a fixed point, a sprocket carried by the roller around which the cable coils extend, sprocket chain connections between said roller sprocket and a shaft of a bracket, said shaft being provided with an operating wheel, ratchet and pawl means for preventing retrograde movement of the operating wheel during a tilting operation and brake means whereby when the pawl is out of engagement with the ratchet the brake will engage the periphery of the operating wheel and be held therein by means of a spring thereby preventing loss of control of the platform during a platform lowering operation.

2. The combination with a tiltable platform pivoted adjacent one of its ends, of downwardly extending brackets carried by the platform, rollers rotatably mounted in said brackets, a cable operated by the rotation of one of said rollers for tilting the platform, said operating roller being operated through sprocket and chain connections with a rotatable shaft rotatably mounted in a bracket, an operating wheel carried by said shaft and adapted to be rotated for tilting the platform, a ratchet wheel carried by the shaft, said ratchet wheel being engaged by a pivoted pawl for preventing retrograde movement of the operating wheel, a brake band bracket provided with a brake band, said brake band being disposed below the operating wheel, one end of said brake band being pivoted in the bracket, the other end of said brake band being pivoted to a lever, said lever being pivoted in a brake band bracket, a coiled spring having one of its ends secured to the lever outside of the lever pivotal point, the other end of said spring being secured to a fixed point, the securing points of the spring being so positioned that when the lever is moved downwardly the brake band will engage and be held in frictional engagement with the operating wheel and when moved upwardly will be held out of engagement with the operating wheel, and an arm carried by the spring and engaging the pivoted dog and forming means whereby the dog will be moved out of engagement with the ratchet wheel when the lever is moved downwardly, said spring forming means whereby when the lever is released the brake band will either be thrown into engagement with the operating wheel or the dog in engagement with the ratchet wheel.

In testimony whereof I have signed my name to this specification in the presence of two subscribing witnesses.

GEORGE F. NEITZEL.

Witnesses:
D. R. HARVEY,
NELLIE E. SHIPLEY.